Jan. 3, 1928.
F. C. KELLEY
1,655,273
JOINING METALS
Filed April 13, 1923
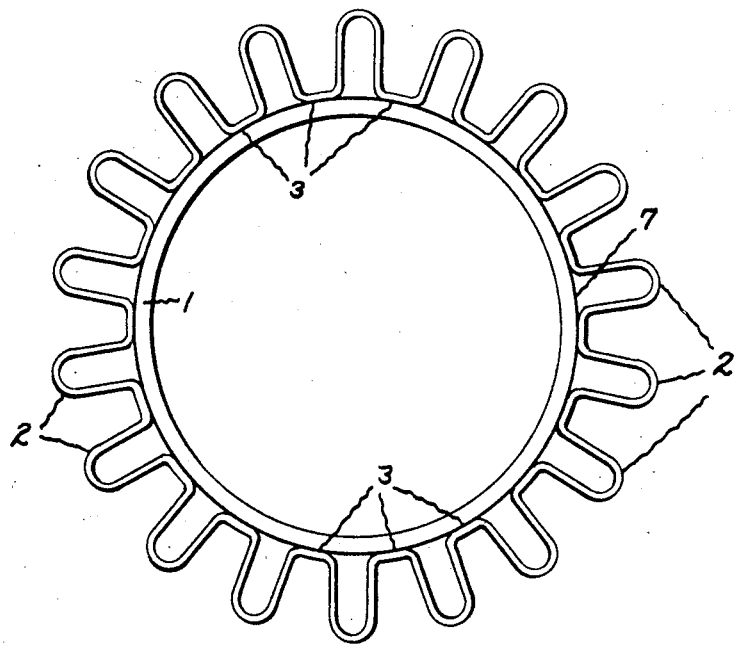
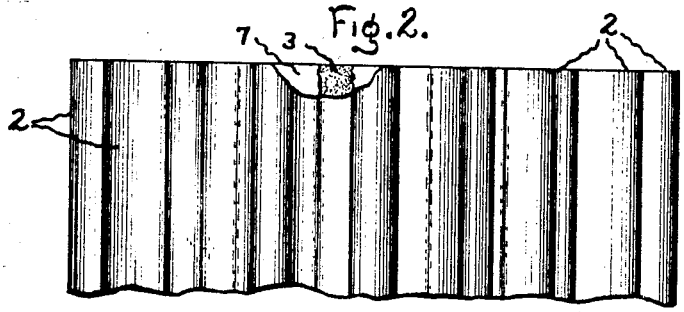
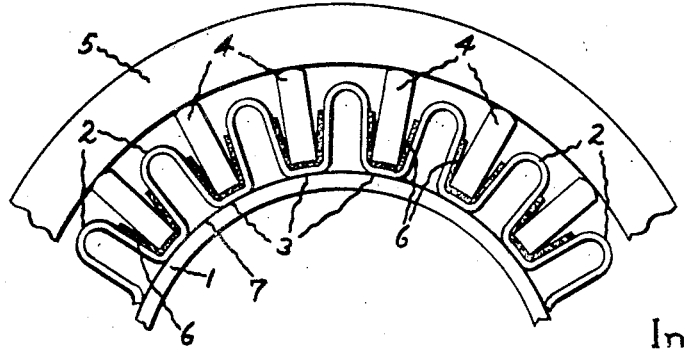
Inventor:
Floyd C. Kelley,
by *Alexander D. Lunt*
His Attorney.

Patented Jan. 3, 1928.

1,655,273

UNITED STATES PATENT OFFICE.

FLOYD C. KELLEY, OF SCHENECTADY, NEW YORK, ASSIGNOR TO GENERAL ELECTRIC COMPANY, A CORPORATION OF NEW YORK.

JOINING METALS.

Application filed April 13, 1923. Serial No. 631,916.

This invention relates to the manufacture of composite metals, and in particular to metal bodies of unlike character and melting point as, for example, the brazing of copper radiator fins to the surface of a steel cylinder.

My invention may be embodied in the new article and method of manufacture covered by a patent application, Serial No. 576,125, filed by Dr. Willis R. Whitney, on July 19, 1922. In accordance with this application the parts to be joined are brazed together by a copper-silver alloy to form a unitary body.

In accordance with my present invention an improved joint is made by providing the steel, or other ferrous metal to be joined, with a coating of copper preliminary to the brazing operation, preferably under conditions causing a wetting of the surface of the iron or steel by molten copper.

One form of composite metal body, embodying my invention, as represented by a cylinder provided externally with a copper radiator is shown in the accompanying drawings, Fig. 1 being an end view, Fig. 2 a side view, and Fig. 3 a view showing the parts assembled for the brazing operation.

When carrying out the invention the iron or steel cylinder 1 is provided with an adherent film of cuprous metal, for example, by electroplating the cylinder with a thin layer of copper. This copper layer preferably is consolidated with the ferrous metal by heating the plated article in hydrogen to the melting point of copper, thereby causing the copper to unite with the iron as a dense, unpeelable film or layer 7. It is convenient but not necessary to coat the entire exterior surface of the iron cylinder even though the coating is required only at the places of attachment of the radiator.

The sheet copper radiator 2 then is brazed upon the copper-coated cylinder in accordance with the Whitney process, that is, as shown in Fig. 3, thin strips 3 of silver-copper alloy are placed between the strips 3 and the plated cylinder 1. An alloy consisting of 28 parts copper and 72 parts silver may be used. These strips may be about 4 mils in thickness. They can be conveniently held in place by metal wedges 4 inserted between the cylinder 1 and a ring 5, asbestos strips 6, preferably being placed about the sides of the wedges as indicated.

The articles thus assembled are heated in a suitable reducing atmosphere, preferably in hydrogen gas, to a temperature sufficiently high to cause the silver-copper alloy to freely flow, that is to a temperature of about 850° C.

The copper coating of the iron cylinder previous to this brazing operation entails two main advantages. In the first place, the brazing alloy will unite more easily and solidly with a copper-coated iron surface than with an uncoated surface; and secondly, there is less tendency for the silver alloy to attack the sheet copper 2 because it is in contact with a greater surface of copper with which it will readily alloy. In other words, the readiness with which the silver-copper alloy brazing strips 3 will be incorporated into the copper coated surface of the cylinder reduces the likelihood of any excess of silver in the brazing material or producing local alloyage and consequently local fusion of the radiator 2, which is being attached to the metal cylinder. In this way a secure and homogeneous joint is more readily produced than when carrying out the brazing operation with an uncoated metal cylinder.

While I have described my invention with particular reference to the forming of copper to iron I wish it to be understood that it is also applicable to the joining or brazing of other non-ferrous metals to iron or other ferrous metal and that alloys of copper or silver, as well as copper may be used for coating the ferrous metal preliminary to the brazing step.

What I claim as new and desire to secure by Letters Patent of the United States, is,—

1. The process of uniting a body of ferrous metal with a body of copper which consists in first providing said ferrous metal with a film of molten copper in the presence of a reducing agent, and then uniting the copper body with said coated surface by brazing.

2. The method which consists in coating a body of iron or steel with copper in hydrogen and then brazing the coated metal to a body of copper in the presence of a reducing agent by a film of silver-copper alloy.

3. An article of manufacture, comprising a body of ferrous metal, an adherent, dense coating of cuprous metal alloyed therewith, a second metal body and a brazing alloy of lower melting than copper uniting said bodies.

4. An article of manufacture, comprising a body of iron or steel, a coating of copper joined thereto by fusion in hydrogen, a body of copper and an alloy of copper and silver uniting said bodies.

5. In combination, a hollow cylinder of ferrous metal, a copper coating welded to the exterior surface of the cylinder, sheet copper fins radiating from said cylinder and permanently connected thereto by a copper-silver brazing alloy having a lower melting point than copper.

In witness whereof, I have hereunto set my hand this 12th day of April, 1923.

FLOYD C. KELLEY.